(12) United States Patent
Feldhahn et al.

(10) Patent No.: US 10,523,282 B2
(45) Date of Patent: Dec. 31, 2019

(54) METHOD, SYSTEM AND APPARATUS

(71) Applicant: NOKIA SOLUTIONS AND NETWORKS OY, Espoo (FI)

(72) Inventors: Herbert Feldhahn, Lonsee (DE); Jaakko Aarne Pohjonen, Espoo (FI); Sheyam Lal Dhomeja, Espoo (FI); Hans Kroener, Geislingen (DE); Benedikt Martin Wolz, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/873,766

(22) Filed: Jan. 17, 2018

(65) Prior Publication Data
US 2018/0205422 A1 Jul. 19, 2018

(30) Foreign Application Priority Data
Jan. 19, 2017 (EP) .................................... 17152080

(51) Int. Cl.
| H04J 3/00 | (2006.01) |
| H04B 7/0408 | (2017.01) |
| H04B 7/024 | (2017.01) |
| H04W 16/28 | (2009.01) |
| H04W 56/00 | (2009.01) |
| H04B 7/06 | (2006.01) |

(52) U.S. Cl.
CPC .......... *H04B 7/0408* (2013.01); *H04B 7/024* (2013.01); *H04B 7/0617* (2013.01); *H04W 16/28* (2013.01); *H04W 56/001* (2013.01)

(58) Field of Classification Search
CPC .......................... H04B 7/0408; H04W 56/001
See application file for complete search history.

(56) References Cited

U.S. PATENT DOCUMENTS

| | | | |
|---|---|---|---|
| 2014/0323144 A1* | 10/2014 | Kim ..................... | H04B 7/0617 455/452.1 |
| 2015/0304868 A1* | 10/2015 | Yu ....................... | H04W 56/001 370/312 |
| 2016/0099761 A1* | 4/2016 | Chen .................... | H04B 7/0408 370/336 |
| 2016/0212631 A1* | 7/2016 | Shen ................... | H04W 56/001 |
| 2017/0054534 A1* | 2/2017 | Sang ...................... | H04L 5/005 |
| 2018/0091212 A1* | 3/2018 | Lee ...................... | H04B 7/0695 |
| 2018/0167883 A1* | 6/2018 | Guo ..................... | H04W 76/27 |

OTHER PUBLICATIONS

European Search Report for European Patent Application No. EP 17152080 dated Apr. 20, 2017 (9 pages).

\* cited by examiner

*Primary Examiner* — Chi H Pham
*Assistant Examiner* — Fahmida S Chowdhury
(74) *Attorney, Agent, or Firm* — Brake Hughes Bellermann LLP

(57) ABSTRACT

A method is provided where a set of beams is transmitted from an access point in a first sweeping order in a first cell. The beams transmit a reference signal. A first subset of the beams is configured to be transmitted in a neighbor zone direction of the first cell, within a first common block of time as a second subset of beams being transmitted in a second cell in a neighbor zone direction. Each beam of the first and second subsets of beams are transmitted at different times in the first common block of time.

12 Claims, 12 Drawing Sheets

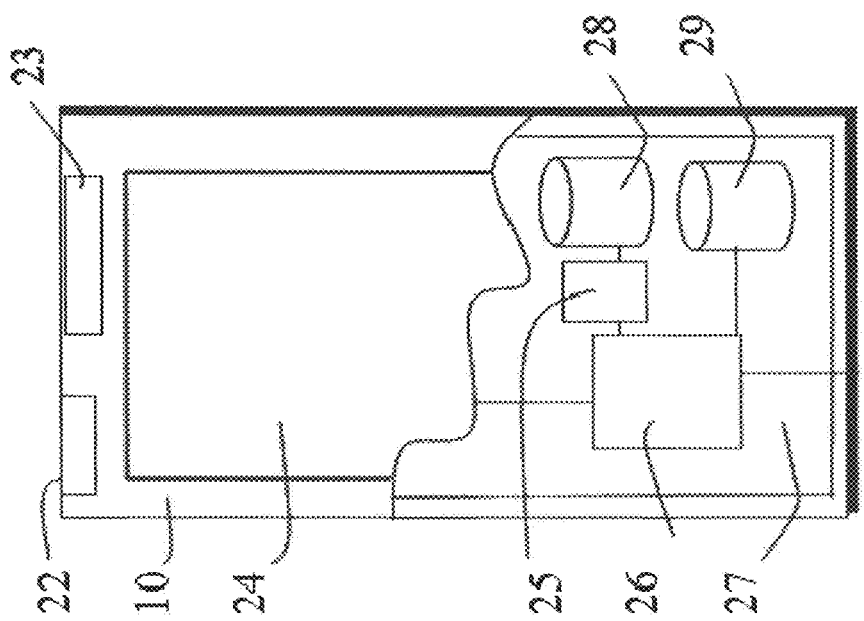
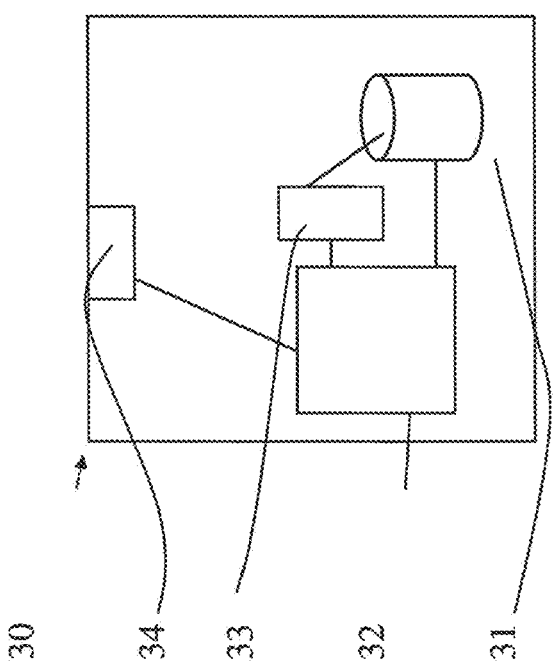

S1 -Cause the transmission from an access point of a set of beams in a first sweeping order in a first cell, the beams transmitting a reference signal, wherein a first subset of the beams is configured to be transmitted in a neighbour zone direction of the first cell, within a first common block of time as a second subset of beams being transmitted in a second cell in a neighbour zone direction, each beam being of the first and second subsets of beams being transmitted at different times in the first common block of time.

Figure 11

METHOD, SYSTEM AND APPARATUS

CROSS-REFERENCE TO RELATED APPLICATIONS

This application claims priority under 37 C.F.R. § 119 (a)-(d) to European Patent Application No. EP17152080, filed Jan. 19, 2017, the disclosures of which is hereby incorporated by reference herein in its entirety.

BACKGROUND OF THE INVENTION

Some embodiments relate to a method, system and apparatus in a scenario where beam forming of transmission and/or receiving beams is used.

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). An example of attempts to solve the problems associated with the increased demands for capacity is an architecture that is known as the long-term evolution (LTE) of the Universal Mobile Telecommunications System (UMTS) radio-access technology. Another example communication system is so called 5G radio access technology.

BRIEF SUMMARY OF THE INVENTION

According to an aspect, there is provided a method comprising: causing transmission from an access point of a set of beams in a first sweeping order in a first cell, said beams transmitting a reference signal, wherein a first subset of said beams is configured to be transmitted in a neighbor zone direction of said first cell, within a first common block of time as a second subset of beams being transmitted in a second cell in a neighbor zone direction, each beam being of said first and second subsets of beams being transmitted at different times in said first common block of time.

Each subset of beams comprises one or more beams.

The neighbor zone region may be a handover region.

Adjacent beams in said first and second cells may be configured to be transmitted in adjacent transmission opportunities.

Said first cell and optionally said second cell may have at least two elevation steps and for at least part of said first cell, said method comprising alternating transmission between said at least two elevation steps.

At least part of said first cell where there is alternating of transmission between said at least two elevation steps may comprise a boresight region of said first cell.

The first and second cells may comprise cell sectors.

One or more of said first and second cells may comprise cell sectors and a transmission order may be configured cell sector wise The access point may comprise a plurality of cell sectors and a same transmission order of said beams may be used in each of said cell sectors.

The access point may comprise a plurality of cell sectors and a different transmission order of said beams may be used in each of said cell sectors.

The method may comprise transmitting a subset of beams covering a boresight region of said first cell within a second common block of time, said subset of beams being a further subset of said set of beams of said first cell.

The second common block of time may be prior to said first common block of time.

At least one of said first and second common block of time may comprise a time slot or a time frame.

The access point may be synchronized with a plurality of other access points.

The first sweeping order may be controlled such that beams are transmitted at a different time to adjacent beams in adjacent cells.

According to another aspect, there is provided an apparatus comprising: means for causing transmission from an access point of a set of beams in a first sweeping order in a first cell, said beams transmitting a reference signal, wherein a first subset of said beams is configured to be transmitted in a neighbor zone direction of said first cell, within a first common block of time as a second subset of beams being transmitted in a second cell in a neighbor zone direction, each beam being of said first and second subsets of beams being transmitted at different times in said first common block of time.

Adjacent beams in said first and second cells may be caused to be transmitted in adjacent transmission opportunities by causing means.

Said first cell and optionally the second cell may have at least two elevation steps and for at least part of said first cell, said causing means may be for alternating transmission between said at least two elevation steps.

At least part of said first cell where there is alternating of transmission between said at least two elevation steps may comprise a boresight region.

The first and second cells may comprise cell sectors.

One or more of said first and second cells may comprise cell sectors and a transmission order may be configured cell sector wise.

The access point may comprise a plurality of cell sectors and a same transmission order of said beams may be used in each of said cell sectors.

The access point may comprise a plurality of cell sectors and a different transmission order of said beams may be used in each of said cell sectors.

The causing means may be for transmitting a subset of beams covering a boresight region of said first cell within a second common block of time, said subset of beams being a further subset of said set of beams of said first cell.

The second common block of time may be prior to said first common block of time.

At least one of said first and second common block of time may comprise a time slot or a time frame.

The access point may be synchronized with a plurality of other access points.

The sweeping order may be controlled by said causing means such that beams are transmitted at a different time to adjacent beams in adjacent cells.

According to another aspect, there is provided an apparatus comprising at least one processor and at least one memory including computer code for one or more programs, the at least one memory and the computer code configured, with the at least one processor, to cause the apparatus at least to: cause transmission from an access point of a set of beams in a first sweeping order in a first cell, said beams transmitting a reference signal, wherein a first subset of said beams is configured to be transmitted in a neighbor zone direction of said first cell, within a first common block of time as a second subset of beams being transmitted in a second cell in a neighbor zone direction, each beam being of said first and second subsets of beams being transmitted at different times in said first common block of time.

The at least one memory and the computer code may be configured, with the at least one processor, to cause adjacent beams in said first and second cells to be transmitted in adjacent transmission opportunities.

Said first cell and optionally the second cell may have at least two elevation steps, wherein for at least part of said first cell, the at least one memory and the computer code are configured, with the at least one processor, to cause the apparatus to alternate transmission between said at least two elevation steps.

The at least part of said first cell where there is alternating of transmission between said at least two elevation steps comprises a boresight region of said first cell.

The first and second cells may comprise cell sectors.

One or more of said first and second cells may comprise cell sectors and a transmission order may be configured cell sector wise.

The access point may comprise a plurality of cell sectors and a same transmission order of said beams is used in each of said cell sectors.

The access point may comprise a plurality of cell sectors and a different transmission order of said beams is used in each of said cell sectors.

The at least one memory and the computer code may be configured, with the at least one processor, to cause the apparatus to transmit a subset of beams covering a boresight region of said first cell within a second common block of time, said subset of beams being a further subset of said set of beams of said first cell.

The second common block of time may be prior to said first common block of time.

The at least one of said first and second common block of time may comprise a time slot or a time frame.

The access point may be synchronized with a plurality of other access points.

The sweeping order may be controlled such that beams are transmitted at a different time to adjacent beams in adjacent cells.

According to another aspect, there is provided a method comprising: sweeping through a set of beams of a base station in a first order, said beams transmitting a synchronization signal, wherein a subset of said beams is configured to be transmitted in a boresight region, within a same time block.

The beams are not transmitted at the same time.

The same time block may be a common slot or sub frame.

This aspect may be used in conjunction with any one or more of the features of the above described aspects. For example, features of the dependent claims may be used in conjunction with this aspect, without requiring all the features of claim 1.

According to another aspect, there is provided an apparatus comprising at least one processor and at least one memory including computer code for one or more programs, the at least one memory and the computer code configured, with the at least one processor, to cause the apparatus at least to: sweep through a set of beams of a base station in a first order, said beams transmitting a synchronization signal, wherein a subset of said beams is configured to be transmitted in a boresight region, within a same time block.

This aspect may be used in conjunction with any one or more of the features of the above described aspects. For example, features of the dependent claims may be used in conjunction with this aspect, without requiring all the features of claim 10.

According to another aspect, there is provided a method comprising: sweeping through a set of beams of a base station in a first order, said beams transmitting a synchronization signal, wherein a subset of said beams which are adjacent one another are configured to be transmitted within a time block.

The beams are not transmitted at the same time.

The same time block may be a common slot or sub frame.

This aspect may be used in conjunction with any one or more of the features of the above described aspects. For example, features of the dependent claims may be used in conjunction with this aspect, without requiring all the features of claim 1.

According to another aspect, there is provided an apparatus comprising at least one processor and at least one memory including computer code for one or more programs, the at least one memory and the computer code configured, with the at least one processor, to cause the apparatus at least to: sweep through a set of beams of a base station in a first order, said beams transmitting a synchronization signal, wherein a subset of said beams which are adjacent one another are configured to be transmitted within a time block.

This aspect may be used in conjunction with any one or more of the features of the above described aspects. For example, features of the dependent claims may be used in conjunction with this aspect, without requiring all the features of claim 10.

A computer program comprising program code means adapted to perform the method(s) may also be provided. The computer program may be stored and/or otherwise embodied by means of a carrier medium. The computer program may be provided on a non transitory computer program carrying medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments will now be described, by way of example only, with reference to the accompanying Figures in which:

FIG. 1 shows a schematic diagram of a control apparatus according to some embodiments;

FIG. 2 shows a schematic diagram of a user device used in some embodiments;

FIG. 4b schematically shows a set of deployed access points, as shown in FIG. 4a;

FIG. 11 shows a method of some embodiments.

DETAILED DESCRIPTION

Figure 3:
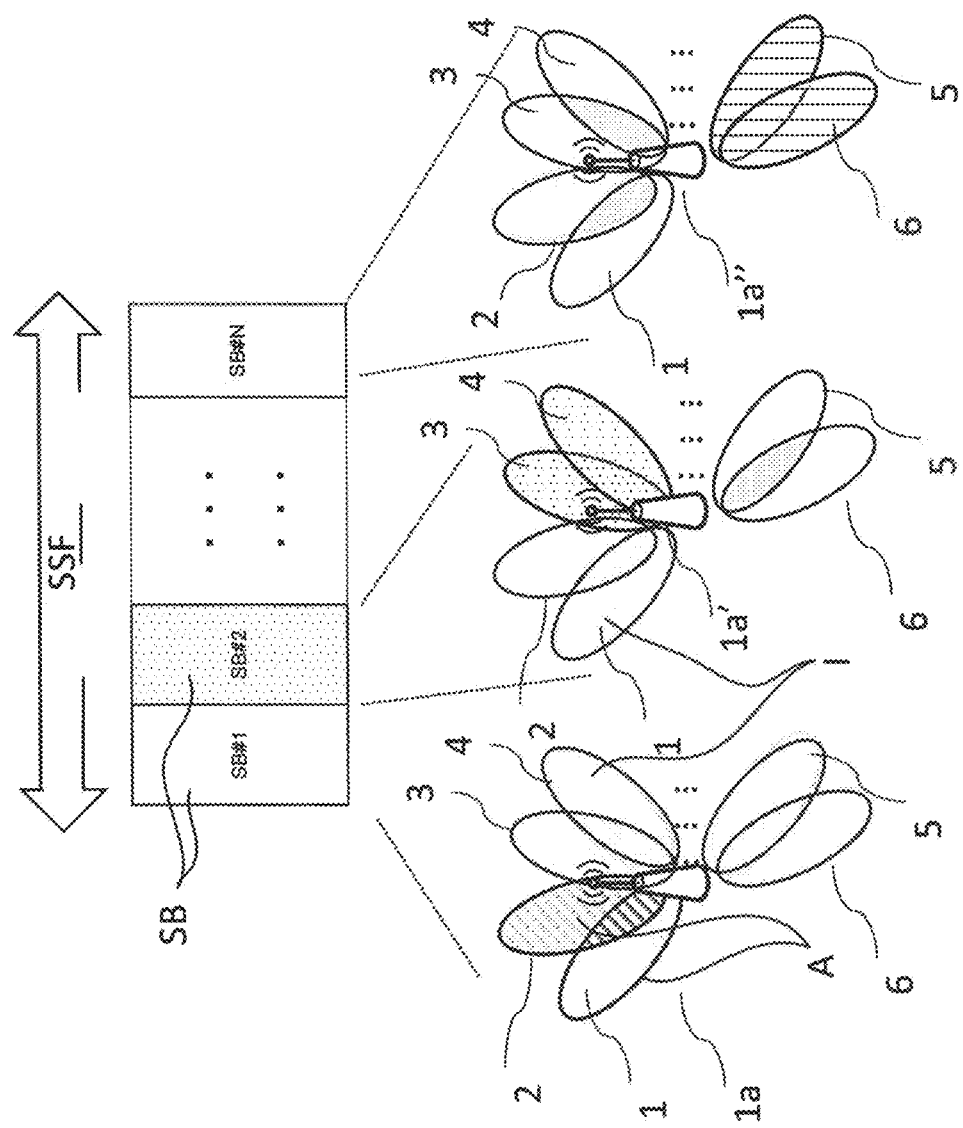
FIG. 3 shows schematically access points with a beam sweeping subframe structure.

In the following certain exemplifying embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1 to 2 to assist in understanding the technology underlying the described examples.

A communication device 10 or terminal can be provided wireless access via base stations or similar wireless transmitter and/or receiver nodes providing access points of a radio access system.

Each of the access points may provide at least one antenna beam directed in the direction of the communication device 10 at a given time. In some embodiments a plurality of beams may be directed at a communication device. The antenna beam can be provided by appropriate elements of antenna arrays of the access points. For example, access links between the access points (AP) and a user equipment (UE) can be provided by active antenna arrays. Such arrays can dynamically form and steer narrow transmission/reception beams and thus serve UEs and track their positions. This is known as user equipment-specific beamforming. The active antenna arrays can be used both at the access point and at the user equipment device to further enhance the beamforming potential. More than one beam can be provided by each access point and/or antenna array.

Access points and hence communications there through are typically controlled by at least one appropriate controller apparatus so as to enable operation thereof and management of mobile communication devices in communication therewith. FIG. 1 shows an example of a control apparatus for a node, for example to be integrated with, coupled to and/or otherwise for controlling any of the access points. The control apparatus 30 can be arranged to provide control on communications via antenna beams by the access points and on operations such as handovers between the access points. For this purpose the control apparatus comprises at least one memory 31, at least one data processing unit 32, 33 and an input/output interface 34. Via the interface the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions may be distributed between several control units. In some embodiments, each base station can comprise a control apparatus. In alternative embodiments, two or more base stations may share a control apparatus.

Access points and associated controllers may communicate with each other via fixed line connection and/or radio interface. The logical connection between the base station nodes can be provided for example by an X2 interface. This interface can be used for example for coordination of operation of the stations.

The communication device or user equipment (UE) 10 may comprise any suitable device capable of at least receiving wireless communication of data. For example, the device can be handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewelry and so on, universal serial bus (USB) sticks with wireless capabilities, modem data cards, machine type devices or any combinations of these or the like.

FIG. 2 shows a schematic, partially sectioned view of a possible communication device. More particularly, a handheld or otherwise mobile communication device (or user equipment UE) 10 is shown. A mobile communication device is provided with wireless communication capabilities and appropriate electronic control apparatus for enabling operation thereof. Thus, the communication device 10 is shown being provided with at least one data processing entity 26, for example a central processing unit and/or a core processor, at least one memory 28 and other possible components such as additional processors 25 and memories 29 for use in software and hardware aided execution of tasks it is designed to perform. The data processing, storage and other relevant control apparatus can be provided on an appropriate circuit board 27 and/or in chipsets. Data processing and memory functions provided by the control apparatus of the communication device are configured to cause control and signaling operations in accordance with certain embodiments of the present invention as described later in this description. A user may control the operation of the communication device by means of a suitable user interface such as touch sensitive display screen or pad 24 and/or a key pad, one of more actuator buttons 22, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The communication device may communicate wirelessly via appropriate apparatus for receiving and transmitting signals. FIG. 2 shows schematically a radio block 23 connected to the control apparatus of the device. The radio block can comprise a radio part and associated antenna arrangement. The antenna arrangement may be arranged internally or externally to the communication device. The antenna arrangement may comprise elements capable of beamforming operations.

Some embodiments relate to mobile communication networks with beamforming techniques. For example, 5G radio access technology and LTE-A (Long term evolution—advanced) evolution have proposed using beamforming techniques. It should be appreciated that other embodiments may be used with any other communication system which uses beamforming. For example some wireless area networks may use beamforming.

The 5G radio system may use frequencies form 400 MHz to 100 GHz. Beamforming is considered to be desirable in enabling the use of the higher frequency bands due to coverage issues. It should be appreciated, that other embodiments may use different frequency ranges.

Some transceivers (e.g., a hybrid transceiver architecture) may use analogue beamforming, which may mean a large amount of narrow beams as this is dependent on the number of antenna elements and carrier frequency. It should be appreciated that other embodiments may be used with digital beamforming transceiver architecture or so-called hybrid transceiver architecture which use a hybrid of digital baseband processing (such as MIMO Multiple Input Multiple Output, and/or digital precoding) and analogue beamforming. It should be appreciated that embodiments can be used with any method of beamforming.

For 5G radio access systems, the cell will be deployed in a grid of beams covering a certain area of the cell at a certain time. For initial cell acquisition and later for beam tracking, the user equipment needs to find the sequentially and spatially broadcasted synchronization signals of the base station or access point. The user equipment can search for the best beam(s) and connect to the 5G system or maintain the connection toward the best beam. The so called beam sweeping covers the whole area of the cell. If the user equipment has found the best beam then either the initial access makes use of the same beam, or the base station is informed about a better beam to which the UE is to be switched.

Reference is made to FIG. 3 which shows one proposal for access points configured with a sweeping sub-frame. The access point is shown changing the beams in time, at a first point in time it is denoted as 1a, at a second point in time as 1a' and at a third point in time as 1a". The access point may be a base station. In some standards, such as 5G, the access point may be referred to as a BS (Base station). A cell coverage area is covered by beams transmitted by the access node. In the example shown in FIG. 3, six beams are shown for the access point. These are beam 1, beam 2, beam 3, beam 4, beam 5, and beam 6. At each time instance, the access point has two active beams in a sweeping block (SB). Consecutive sweeping blocks are transmitted by the base station, each sweeping block consisting of different beams compared to other sweeping blocks. Beam 1 and beam 2 are active at first time instance in the sweeping block 1, beam 3 and beam 4 are active for the second sweeping block 2, and beam 5 and beam 6 are active for the Nth sweeping block N. During a sweeping block, only some of the beams are active, the rest of the beams are inactive.

To enable system access, periodical transmission of system information may be required per direction where one or more beams cover a specific area of a cell. The corresponding directions may need to be covered to provide resources for system access. When an access point covers a specific area with a set of beams during a time interval (such as symbol duration or two symbol durations) it is called a sweep block. FIG. 3 illustrates the concept of sweep blocks: For sweep block SB#2 the beams 3 and 4 are active and for sweep block SB#N the beams 5 and 6 are active. Active beams are referenced A in FIG. 3 and inactive beams are referenced I.

FIG. 3 further depicts a sweeping sub-frame SSF. The sweeping sub-frame may provide coverage for common control channel signaling with beamforming. The sweeping sub-frame consists of sweeping blocks SB.

The total number of beams required to cover the required cell area may be larger than the number of concurrent active beams that the access point is able to form. Therefore access points need to sweep through the cell coverage area in the time domain by activating a different set of beams on each sweep block. Depending on the number of active beams per sweep block and on the total number of beams required to cover a cell area, two or more sweep blocks may be required. Furthermore, the number of sweep blocks per sub-frame is limited by the length of each sweep. As an example, one sweep block duration may be one or two symbols (for example, OFDM (orthogonal frequency-division multiplexing) symbols) and if there are 14 symbols per sub-frame, the sweeping sub-frame would be able to accommodate 7 or 14 sweep blocks. Depending on the number of sweep blocks required to cover a cell, a plurality of sweeping sub-frames may be needed. However, this is by way of example only and different configurations may be used in different embodiments.

The active beams depicted in FIG. 3 may be used for either transmitting or receiving information. The sweeping sub-frame can therefore be defined as a downlink sweeping sub-frame, when the active beam is transmitting information, or as an uplink sweeping sub-frame, when the active beam is receiving information. Furthermore, assuming a TDD (time division duplex) system and reciprocity between downlink and uplink channels, to cover a cell area on the uplink and the downlink directions with the same beam configurations per sweep block, the same sweep blocks need to be defined on uplink and downlink direction.

As an example of downlink direction, if downlink common control channel coverage is provided by the sweeping sub-frame, each sweep block may carry cell access information such as one or more of downlink synchronization signals, system information such as MIB (master information block), SIB (system information block) or the like. Other examples or information which may be include alternatively or additionally comprise one or more of, PRACH/RACH (physical random access channel and random access channel configurations), paging, and any control information that needs to be broadcasted in a cell. In the uplink direction, the sweeping sub-frame/sub-frames may accommodate resources for the random access channel or other uplink channels requiring periodic availability such as SR (scheduling request).

A non-limiting definition for a beam is a detection of a beam specific reference signal (BRS). In one example, a beam specific reference signal BRS is mapped to an antenna port which maps to at least one, typically a plurality of, antenna elements. The signals leading to the antenna elements are individually weighted (depending on architecture this may be analogue or digital weighting), to form a specific radiation pattern.

Multiple antenna ports may be defined (thus multiple radiation patterns may be formed) which are identified by detection of different beam specific reference signals. These radiation patterns may be equally shaped but may point in different directions.

A single beam specific reference signal may be mapped to two or more antenna ports which may or may not map to the same antenna elements. In some embodiments, antenna elements can be mapped dynamically to different ports. One example is to transmit a beam specific reference signal using two antenna ports where the antenna element specific weights are equal, but the first antenna port maps to elements that are horizontally polarized (H-polarization) and second antenna port maps to elements which are vertically polarized (V-polarization). Thus, the radiation patterns of the elements of the first and second ports are the same but if the same beam specific reference signal is transmitted through both ports they are observed as a single beam. In some embodiments, a beam specific reference signal may be transmitted on two or more ports where the antenna element specific weighting is not equal (different radiation patterns).

In a beamformed system where the cell coverage is provided by multiple beams, it may be beneficial to identify a single beam e.g., by using beam specific reference signals enabling user equipment to perform beam level detection/separation and perform measurements on beam specific reference signal. The measurements may determine indicators such as, but not limited to, one or more of Reference Signal Received Power (RSRP), Reference Signal Received Quality (RSRQ), received signal strength indicator (RSSI)), channel quality indicator (CQI) or the like. Identifying different beams may be beneficial e.g., when user equipment indicates to the network access point the preferred communication beam during initial access or mapping a measurement to a common reference beam index when reporting the measurements to the network access point.

To identify a beam, the following mappings can be made: e.g., if eight different beam reference signals are transmitted per sweep block, the receiver is potentially able to measure eight different signals simultaneously. The eight different BRS signals are corresponding to eight antenna ports. The same beam specific reference signal antenna ports may be reused in the next sweep block. Thus, a beam index can be defined to be uniquely constructed from the antenna port number and the sweep block ID.

To achieve sufficient coverage and capacity in a cellular network, propagation/path loss of the radio channel at high carrier frequencies, e.g., 28 GHz or similar frequencies, may be compensated by introducing directive transmission and reception in the form of beamforming, e.g., via large scale antenna arrays. As a result of this, relatively large antenna array gains, at both the access point, (e.g., 18 dB with 64 antenna elements) and the user equipment (e.g., 9 dB with 8 antenna elements) may be achieved to compensate propagation loss and/or losses for example due to rain and oxygen absorption. Different embodiments may of course operate at different carrier frequencies.

Some embodiments may use a carrier frequency of 28 GHz and a system bandwidth of 100 MHz. However, this is by way of example only and different carrier frequencies and/or bandwidths may be used in other embodiments.

Some embodiments may use a hybrid multi antenna deployment at the base station (BS). The UE may be able to perform analogue/RF beamforming or any other suitable beamforming. Some embodiments may provide a signaling method to enable beam transmission and exploitation at the receiver.

To exploit the full merit of large scale antenna arrays, such as phased antenna array technology, directivity at transmitter and receiver need to be dynamically adjusted according to a deployment scenario and potential changes in a radio link between transmitter and receiver.

It has been recognized by the inventors that the sweeping order may impact significantly the quality of the measurement of the beams. For the selection of the best beam based on the received power of the beam's reference signal (e.g., BRSRP), the UE measures all the beams and decides on the best beam. The radio channel may however be changing, for example due to fast fading or the like. Comparison of beams in geographically neighboring areas but which are measured at different times, because of scheduling in different slots or subframes, may have different results. In addition, the noise/interference level would have to be relatively low to have accurate measurement of these beams. There may be relatively high interference from neighbor cells as the beam sweeping is not optimized for a network deployment. The noise/interference level may be influenced by neighbor cells sending out their beam reference signals at the same time to the same area.

Selection of the wrong beam, because of disturbed measurement, can result in ping-pong switching of beams or reduced throughput for the user equipment.

In a grid of beams the broadcast channels and the beam reference signals of the cells may be sent sequentially. This may be optimized so as to improve accuracy of the measurement by the user equipment.

The sequence of the beams within one cell may have all beams towards either the boresight or the neighbor zone within the same slot or a close subframe. The aim may be to have comparable power measurements for the most suitable beams for each user equipment at the most relevant positions in the cell. This may mitigate the impact of fast fading. The noise/interference from neighbor cells may be minimized so that the beams to be measured are not disturbed.

The sequence of the beams may be adjusted with respect to one or more of the following criteria:

a) Inside each cell the beams in the boresight (main lobe) aim to reach a relatively high modulation and coding scheme (MCS). Those beams may be targeting the area where most traffic is expected for this cell. Here an aim may be to minimize the impact from fast fading effects. To reduce noise/interference towards neighbor access points, those beams are ordered to sweep alternatively between inner and outer beams. Neighbor cell interference may be reduced accordingly.

b) Inside each cell the beams at the sector border are coordinated between the two sectors, to ensure that those beams are not sent at the same time but very close together in time. This is so that any hand-over (HO) decision is based on substantially the same, or at least as close as possible, channel conditions to avoid unnecessary HO between the sectors.

c) The spatial neighbor beams between cells of the same access point may be sent in a close sequence but not at the same time to the same or nearby geographical area.

d) The spatial neighbor beams between cells of distant access points may be sent in a relatively close sequence but not at the same time. This is ensured by selection of those beams in the same or neighbor radio time slot. The noise/interference level may be reduced by the sequence of sweeping beams avoiding an overlap in time. To ensure a relatively low level of noise/interference on network level the sweeping order in each cell may be changed.

Some examples of this for different beam grid setups will be described with reference to FIGS. 4 to 10. The arrangements illustrated in these Figures generally satisfy one or more of the above mentioned criteria. However, it should be appreciated that other embodiment may not satisfy all of these criteria and may satisfy only one, only two or only three of the above criteria.

The numbers beside the beam show the sequence of the beams sent one by one cell or cell sector. The beam zone numbering is shown for all sectors. The beams with the same number are sent at the same time. A regular network deployment may be shown that makes use of the associated beam sweeping order. The arrows with the same reference number summarize the beams sent at the same time and show if neighbor cells are disturbing each other, when sweeping the same sequence of beams in same arrow direction. One or two arrows (set of beams) are mapped to the sending slot/subframe of the beams. This more abstract visualization of the beam sequence shows in the network deployment the targeted beam zones.

Figure 4B:
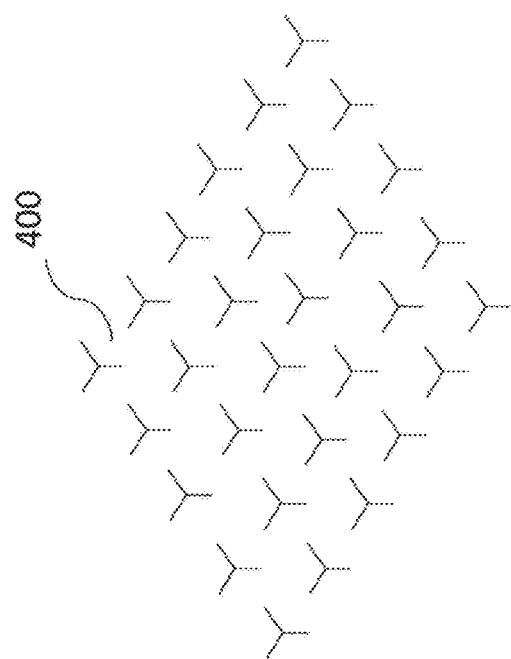
Figure 4A:
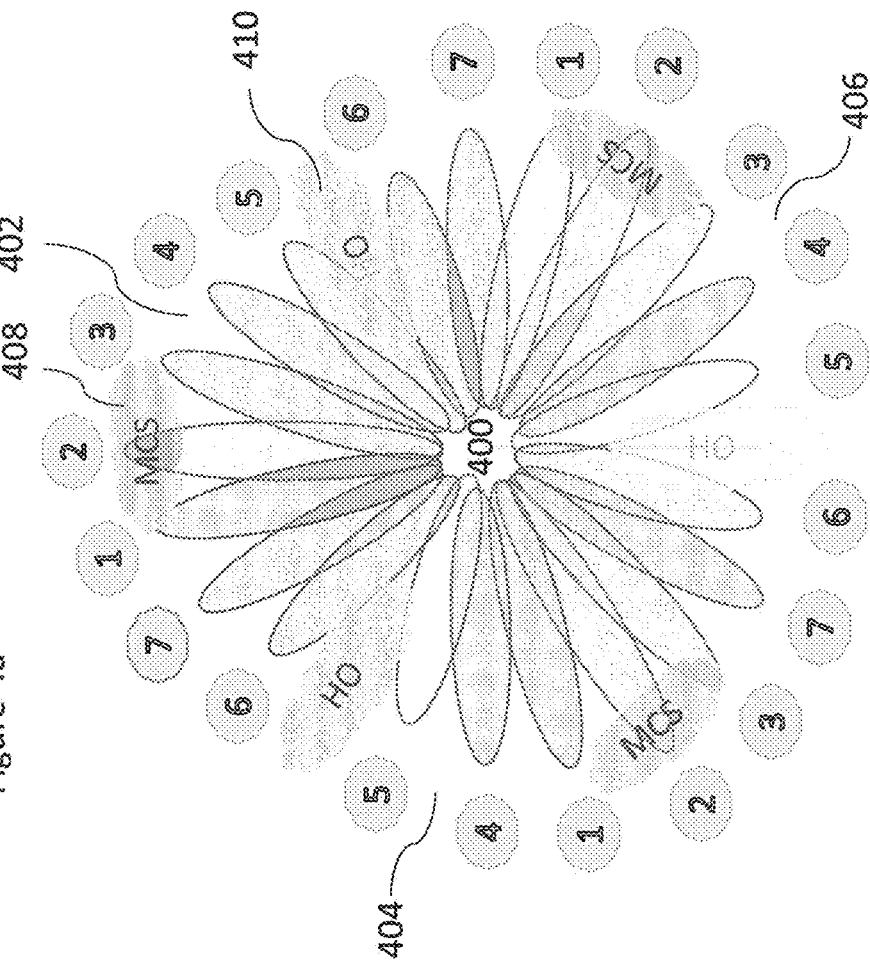
FIG. 4a shows a beam sweeping sequence with a 3 cell sector access point with a fixed grid of 7 beams.

Reference is made first to FIG. 4a which shows a single elevation step and 7 azimuth steps. There is sweeping in a fixed grid of 7 beams. In this embodiment, there is an access point 400 which provides three cell sectors 402, 404 and 406 each having a cell sector angle of 120 degrees.

Inside each cell the beams in the boresight (main lobe) aim to reach a relatively high modulation and coding scheme (MCS). Those beams may be targeting the area where most traffic is expected for this cell. These beams may be in the central region 408 of each cell sector. The beam number refers to the order in which the beams are swept.

The beams in the boresight area may be swept through in the same period of time, for example a time slot. For each of the three cell sectors, the bore sight beams are 1, 2 and 3 with beam 2 being the middle beam.

For the beams which are adjacent one another but in different sectors, these beams are sent relatively close in time but not at the same time. For example the beams may be sent in consecutive or near consecutive transmission opportunities. For example beam 5 of one sector may be transmitted close in time to beam 6 of the adjacent sector. It should be appreciate that the border region 410 between two sectors represents a potential hand over region.

Reference is made to FIG. 4b which schematically shows a number of access points 400 each of which supports three cell sectors with the beam sweeping pattern shown in FIG. 4a. As will be appreciated from the schematic representations, the handover region between two sectors of one access point will be adjacent to the bore sight region of an adjacent cell sector of a different access point. As the beams in the hand over region are transmitted at different times to the boresight beams, interference may be minimized.

Figure 5B:
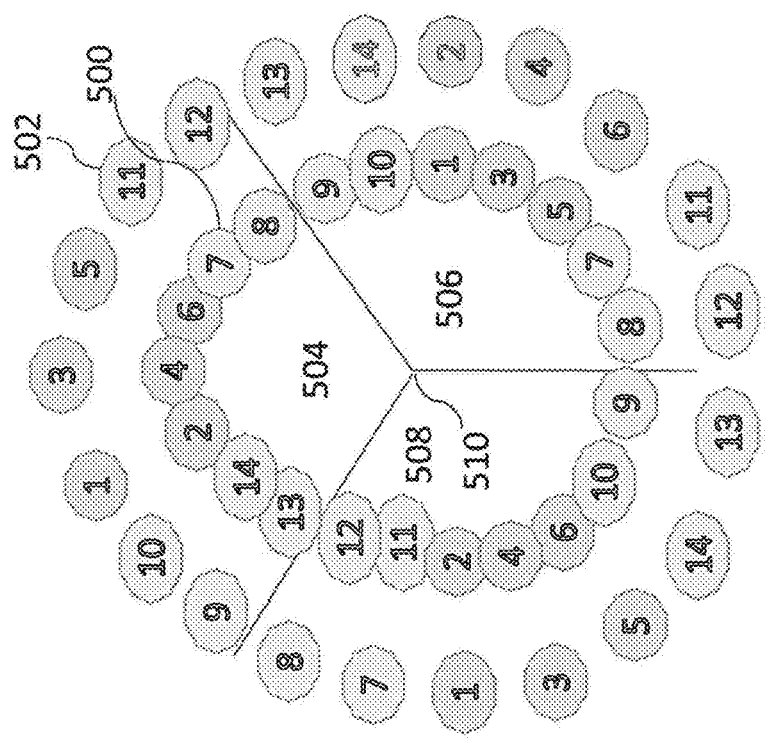
FIGS. 5a and 5b show a beam sweeping sequence with a 3 cell sector access point with 2 elevation steps and 7 azimuth steps.
Figure 5A:
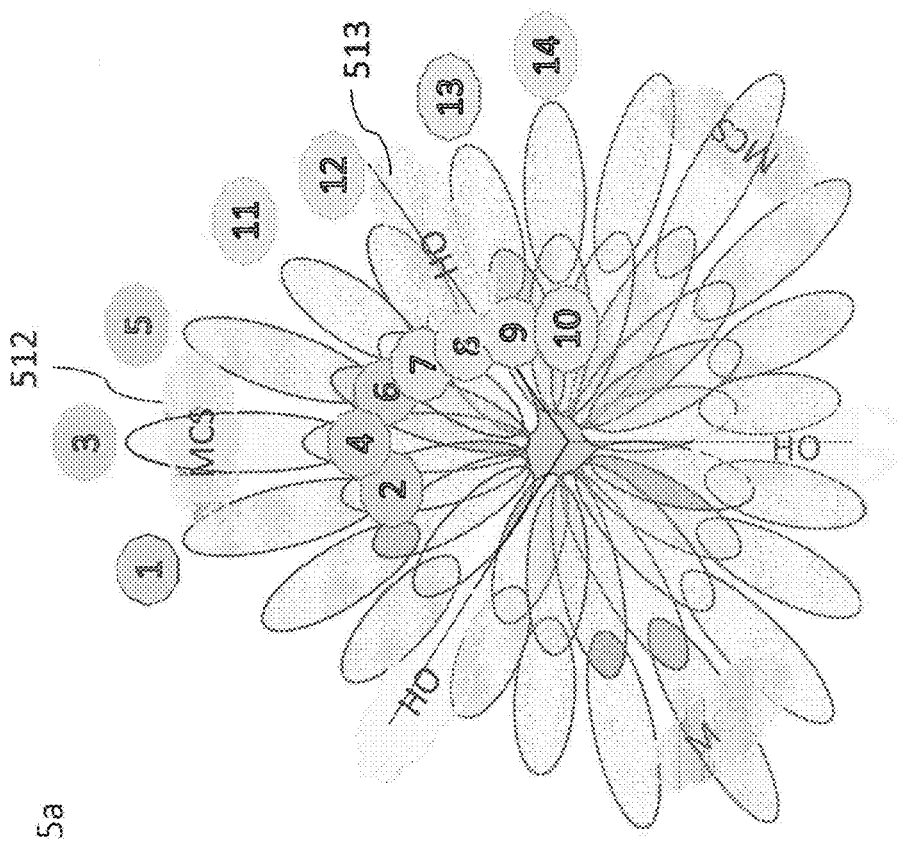

Reference is made to FIG. 5. In FIGS. 5a and b, there are two elevation steps (i.e., groups of beams are send in mainly two different angles in vertical direction for two elevation steps or n different angles in the vertical direction for n elevation steps) so there is an inner circle 500 of beams and an outer circle of beam 502 for the sectors of the access point 510. This may mean that there will be a corresponding inner and outer circle of areas where in one cell one "best" beam at a time can be measured. In this example, there is beam sweeping in a fixed grid of 14 beams with 2 elevation steps and 7 azimuth steps. In other words, there are seven beam directions in each of the inner and outer circles of beams of each sector. As can be seen from FIGS. 5a and b there are again three sectors, 504, 506 and 508, each of 120 degrees.

Once again, inside each cell the beams in the boresight (main lobe) aim to reach a relatively high modulation and coding scheme (MCS). Those beams may be targeting the area where most traffic is expected for this cell. These beams may be in the central region 512 of each cell sector. The border or handover region is referenced 513.

The beams in the boresight area may be swept through in the same period of time, for example a time slot. There is alternate transmission between the inner and outer beam areas.

For the first sector 504, the boresight beams are referenced 1, 3 and 5 for the outer circle and 2, 4, 6 for the inner circle.

Beams 10 and 9 are adjacent the MCS region on one border region and beams 11 and 12 on the other border region, for the outer circles. For the inner circle, beams 14 and 13 are adjacent the MCS region on one border region and beams 7 and 8 on the other border region.

For the second sector 506, the boresight beams are referenced 1, 3 and 5 for the inner circle and 2, 4, 6 for the outer circle.

Beams 14 and 13 are adjacent the MCS region on one border region and beams 11 and 12 on the other border region, for the outer circles. For the inner circle, beams 10 and 9 are adjacent the MCS region on one border region and beams 8 and 7 on the other border region.

For the third sector 508, the boresight beams are referenced 1, 3 and 5 for the outer circle and 2, 4, 6 for the inner circle.

Beams 14 and 13 are adjacent the MCS region on one border region and beams 7 and 8 on the other side, for the outer circles. For the inner circle, beams 10 and 9 are adjacent the MCS region on one border region and beams 11 and 12 on the other side.

For the beams which are adjacent one another but in different sectors, these beams are sent relatively close in time but not at the same time. For example the beams may be sent in consecutive or near consecutive transmission opportunities. For example beam 12 of sector 504 may be transmitted close in time to beam 13 of the adjacent sector 506.

Preferably the beams of one elevation step on the border of one sector is transmitted in an adjacent transmit opportunity to beams of the same elevation step on the border of the adjacent sector. In other words, adjacent beams are transmitted in adjacent transmit opportunities even though the beams are in different cell sectors.

Figure 6B:
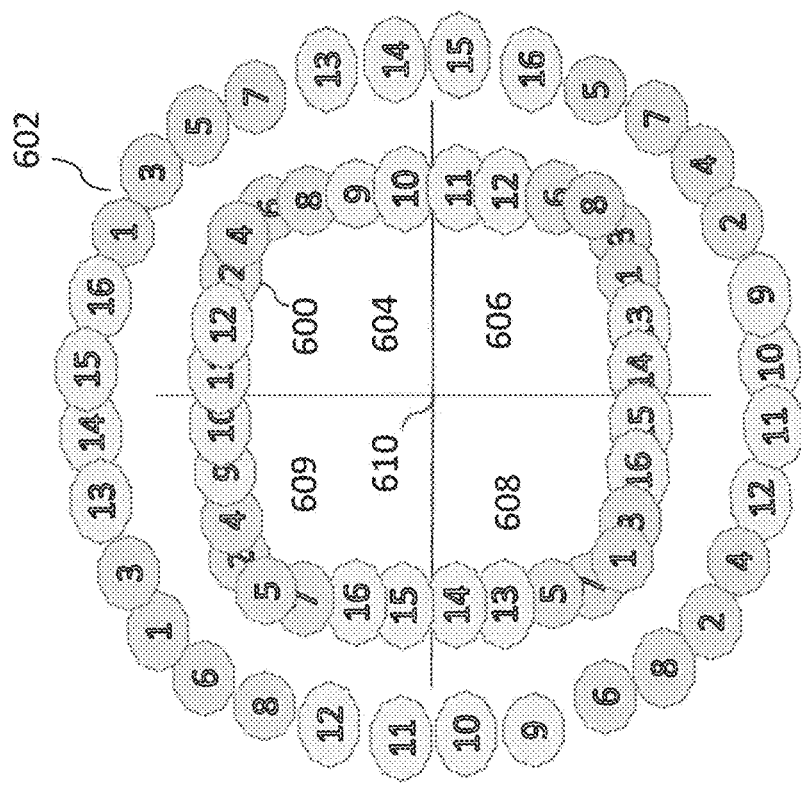
FIGS. 6a and 6b shows a beam sweeping sequence with a 4 cell sector access point with 2 elevation steps and 8 azimuth steps.
Figure 6A:
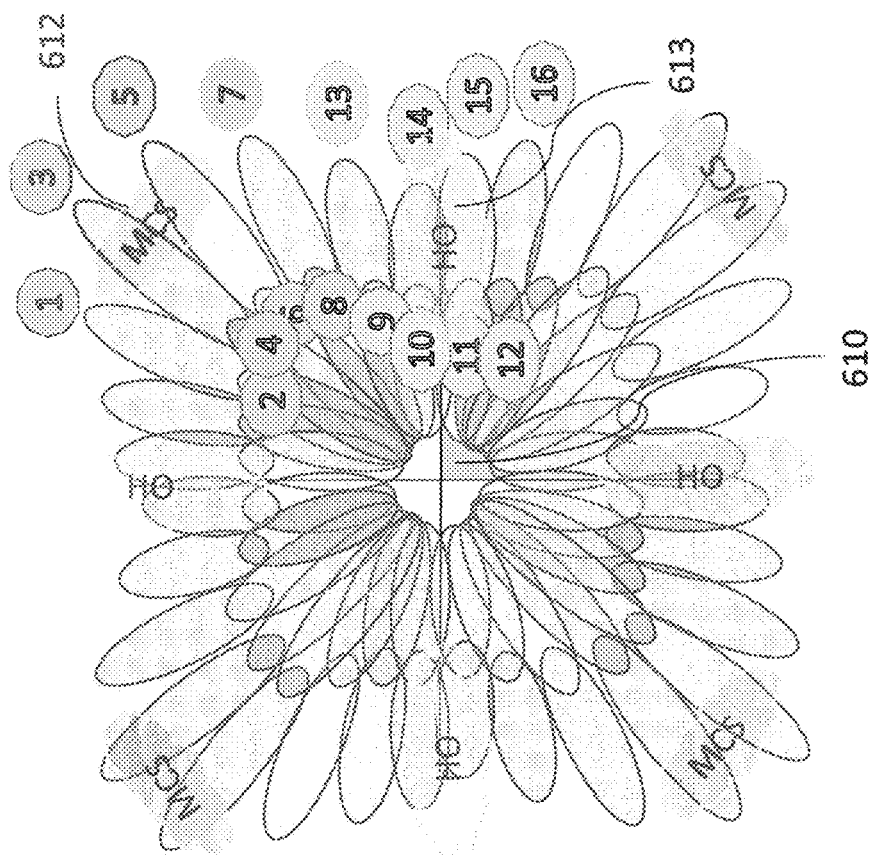

Reference is now made to FIG. 6. FIG. 6a shows the beam pattern and FIG. 6b shows the beam sequence. In FIGS. 6a and 6b, there are two elevation steps so there is an inner circle 600 of beams and an outer circle of beam 602 for the sectors of the access point 610. This may mean that there will be a corresponding inner and outer circle of areas where in one cell one "best" beam at a time can be measured. In this example, there is beam sweeping in a fixed grid of 16 beams with 2 elevation steps and 8 azimuth steps. In other words, there are eight beam directions in each of the inner and outer circles of beams of each sector. As can be seen from FIGS. 6a and b there are four 604, 606 and 608, and 609 cell sectors each of 90 degrees.

Once again, inside each cell the beams in the boresight (main lobe) aim to reach a relatively high modulation and coding scheme (MCS). Those beams may be targeting the area where most traffic is expected for this cell. These beams may be in the central region 612 of each cell sector. The border or hand over region is referenced 613.

The beams in the boresight area may be swept through in the same period of time, for example a time slot. There is alternate transmission between the inner and outer beam areas.

For the first sector 604, the boresight beams are referenced 1, 3, 5 and 7 for the outer circle and 2, 4, 6 and 8 for the inner circle.

Beams 16 and 15 are adjacent the MCS region on one border region and beams 13 and 14 on the other border region, for the outer circles. For the inner circle, beams 12 and 11 are adjacent the MCS region on one border region and beams 9 and 10 on the other border region.

For the second sector 606, the boresight beams are referenced 1, 3, 8 and 6 for the inner circle and 2, 4, 7 and 5 for the outer circle.

Beams 16 and 15 are adjacent the MCS region on one border region and beams 9 and 10 on the other border region, for the outer circles. For the inner circle, beams 11 and 12 are adjacent the MCS region on one border region and beams 13 and 14 on the other border region.

For the third sector 608, the boresight beams are referenced 6, 8, 2 and 4 for the outer circle and 5, 7, 1 and 3 for the inner circle.

Beams 12 and 11 are adjacent the MCS region on one border region and beams 10 and 9 on the other side, for the outer circles. For the inner circle, beams 16 and 15 are adjacent the MCS region on one border region and beams 13 and 14 on the other side.

For the fourth sector 609, the boresight beams are referenced 7, 5, 2 and 4 for the inner circle and 8, 6, 1 and 3 for the outer circle.

Beams 11 and 12 are adjacent the MCS region on one border region and beams 13 and 14 on the other border region, for the outer circles. For the inner circle, beams 15 and 16 are adjacent the MCS region on one border region and beams 9 and 10 on the other border region.

For the beams which are adjacent one another but in different sectors, these beams are sent relatively close in time but not at the same time, as with the previous example.

Figure 7:
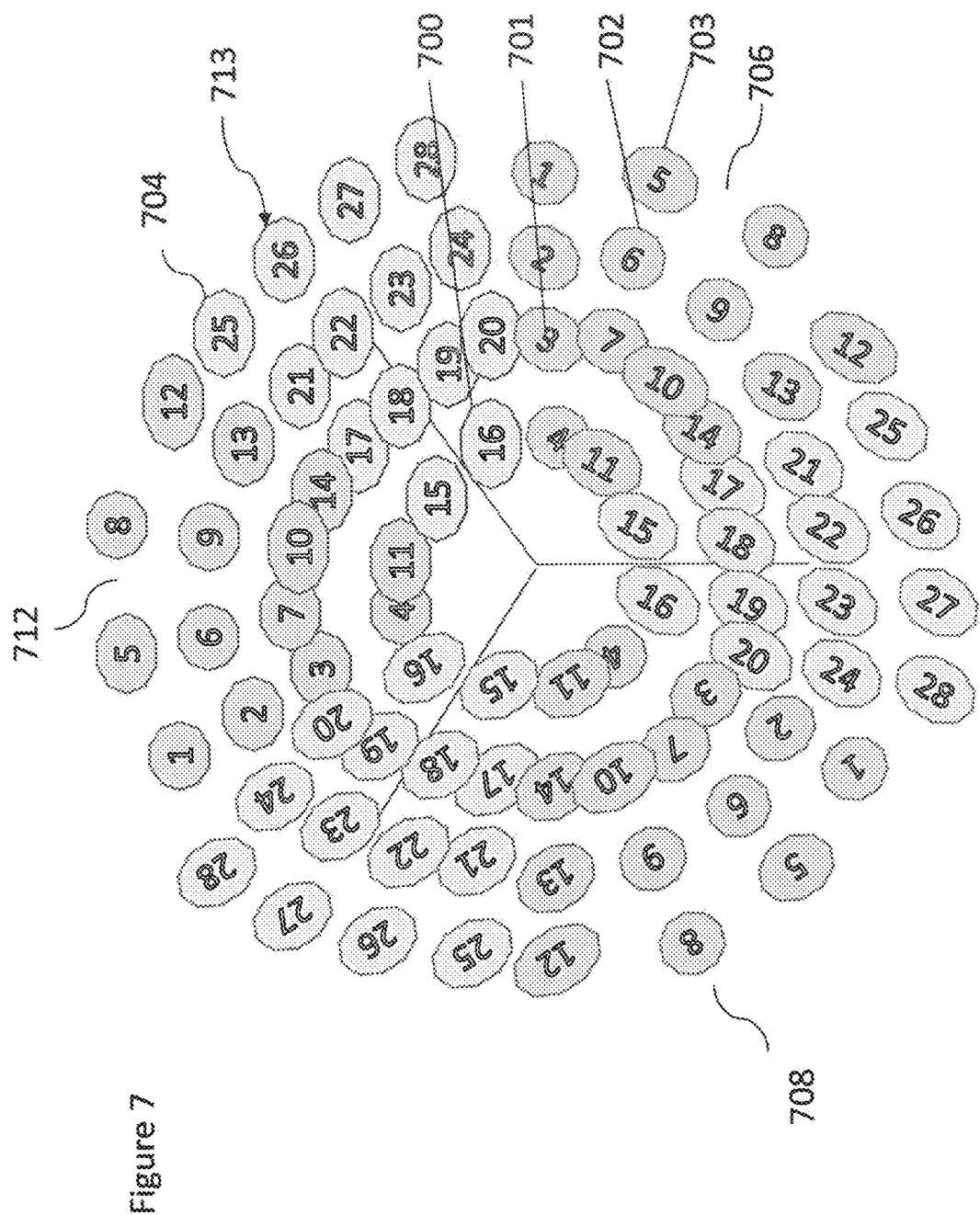
FIG. 7 shows a beam sweeping sequence with a 3 cell sector access point with 4 elevation steps and 8 azimuth steps.

Reference is made to FIG. 7. In FIG. 7, there are four elevation steps so there is are four circles of beams, 700, 701, 702 and 703 going from the innermost circle to the outermost circle. This may mean that there will be a corresponding circle areas where in one cell one "best" beam at a time can be measured. In this example, there is beam sweeping in a fixed grid of 28 beams with 4 elevation steps and 8 azimuth steps. As can be seen from FIG. 7 there are again three sectors, 704, 706 and 708, each of 120 degrees.

Once again, inside each cell the beams in the boresight (main lobe) aim to reach a relatively high modulation and coding scheme (MCS). Those beams may be targeting the area where most traffic is expected for this cell. These beams may be in the central region 712 of each cell sector. The handover regions are referenced 713. In the following example, the beam order is the same for each cell sector and is summarized by the table below. It should be noted that in this example, there may be fewer beams formed in the inner most circle (4) as compared to the other circles (8).

| Elevation | border | border | Boresight | Boresight | Boresight | Boresight | Border | border |
|---|---|---|---|---|---|---|---|---|
| 4 (outside) | 27 | 28 | 1 | 5 | 8 | 12 | 25 | 26 |
| 3 | 23 | 24 | 2 | 6 | 9 | 13 | 21 | 22 |
| 2 | 19 | 20 | 3 | 7 | 10 | 14 | 17 | 18 |
| 1 (Inner) |  | 16 | 4 | 11 |  |  | 15 |  |

Figure 8:
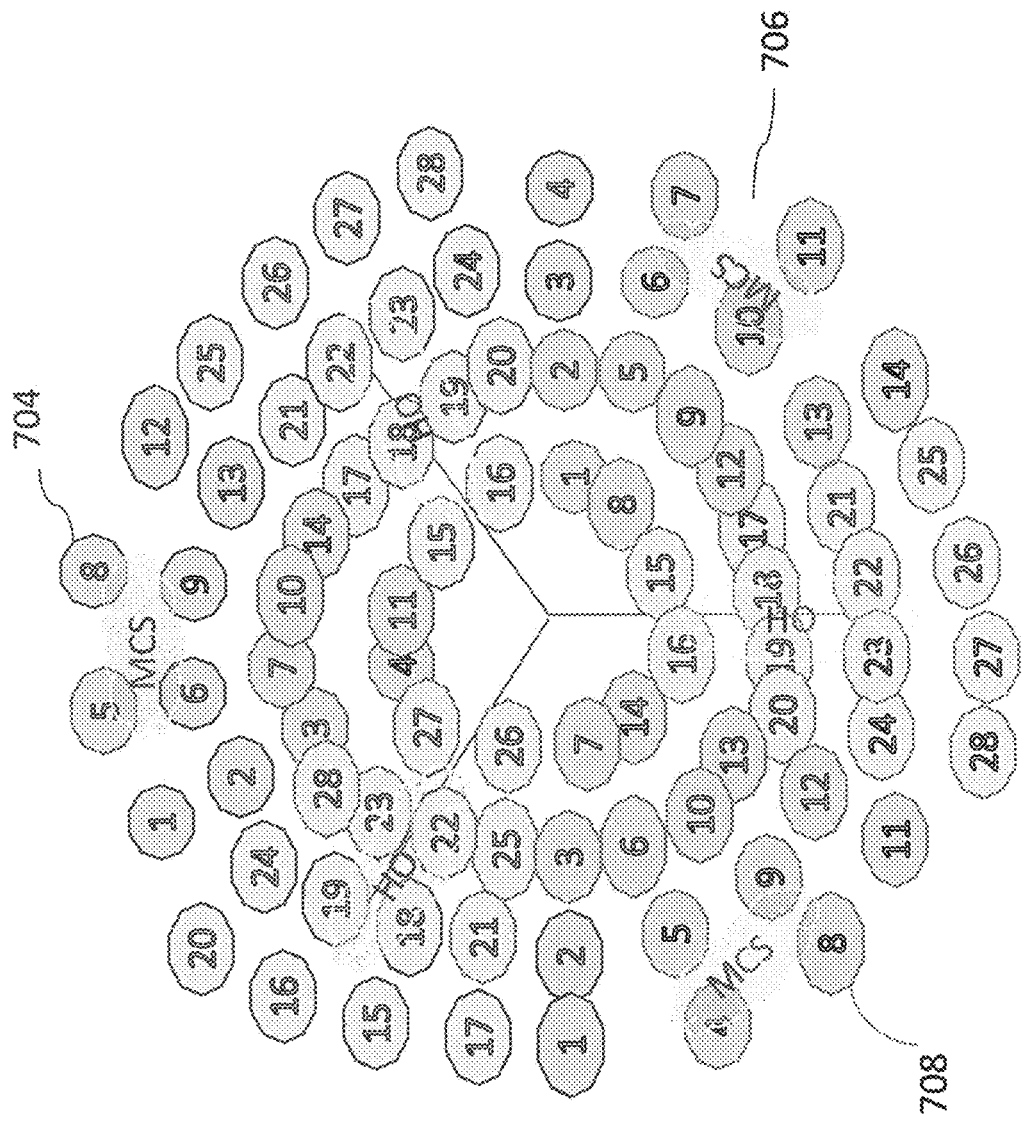
FIG. 8 shows a beam sweeping sequence with a 3 cell sector access point with 4 elevation steps and 8 azimuth steps.

Reference is made to FIG. 8 which has the same scenario as FIG. 7 in terms of numbers of beams, elevation steps and azimuth steps but a different beam sweeping order. The same reference numbering is used as for FIG. 7. The following tables summarize the beam sweeping order for each cell sector.

Cell Sector 704

| Elevation | border | border | Boresight | Boresight | Boresight | Boresight | Border | border |
|---|---|---|---|---|---|---|---|---|
| 4 (outside) | 16 | 20 | 1 | 5 | 8 | 12 | 25 | 26 |
| 3 | 19 | 24 | 2 | 6 | 9 | 13 | 21 | 22 |
| 2 | 23 | 28 | 3 | 7 | 10 | 14 | 17 | 18 |
| 1 (Inner) |  | 27 | 4 | 11 |  |  | 15 |  |

Cell Sector 706

| Elevation | border | border | Boresight | Boresight | Boresight | Boresight | Border | border |
|---|---|---|---|---|---|---|---|---|
| 4 (outside) | 27 | 28 | 4 | 7 | 11 | 14 | 25 | 26 |
| 3 | 23 | 24 | 3 | 6 | 10 | 13 | 21 | 22 |
| 2 | 19 | 20 | 2 | 5 | 9 | 12 | 17 | 18 |
| 1 (Inner) |  | 16 | 1 | 8 |  |  | 15 |  |

Cell Sector 708

| Elevation | border | border | Boresight | Boresight | Boresight | Boresight | Border | border |
|---|---|---|---|---|---|---|---|---|
| 4 (outside) | 27 | 28 | 11 | 8 | 4 | 11 | 17 | 15 |
| 3 | 23 | 24 | 12 | 9 | 5 | 2 | 21 | 18 |
| 2 | 19 | 20 | 13 | 10 | 6 | 3 | 25 | 22 |
| 1 (Inner) |  | 16 | 14 | 7 |  |  | 26 |  |

Reference is made to FIG. 9. FIG. 9 shows schematically for various different configurations the access points. The schematic arrows represent the direction of sweeping.

Figure 9B:
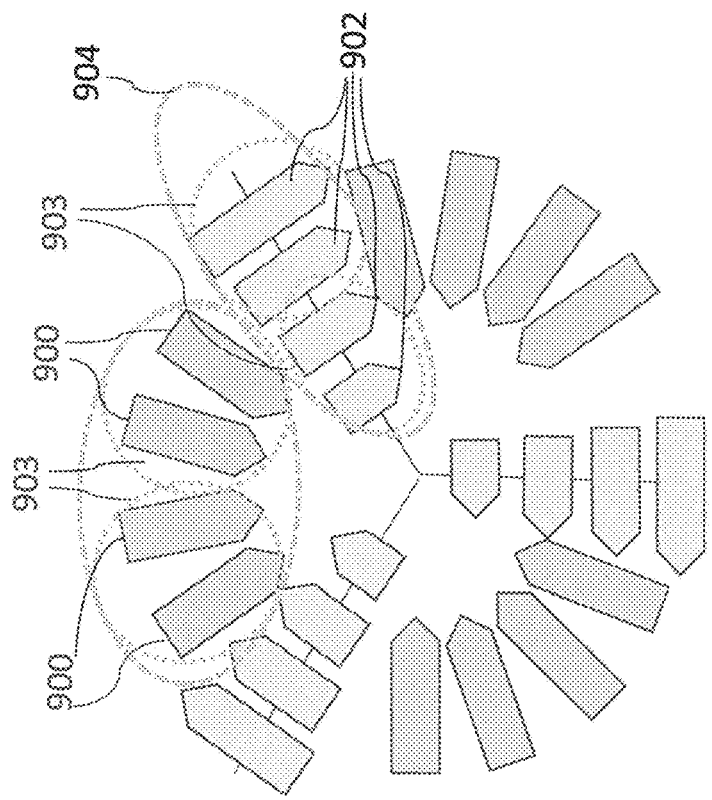
FIGS. 9a to 9e show examples of slot and subframe mappings for different access points.
Figure 9A:
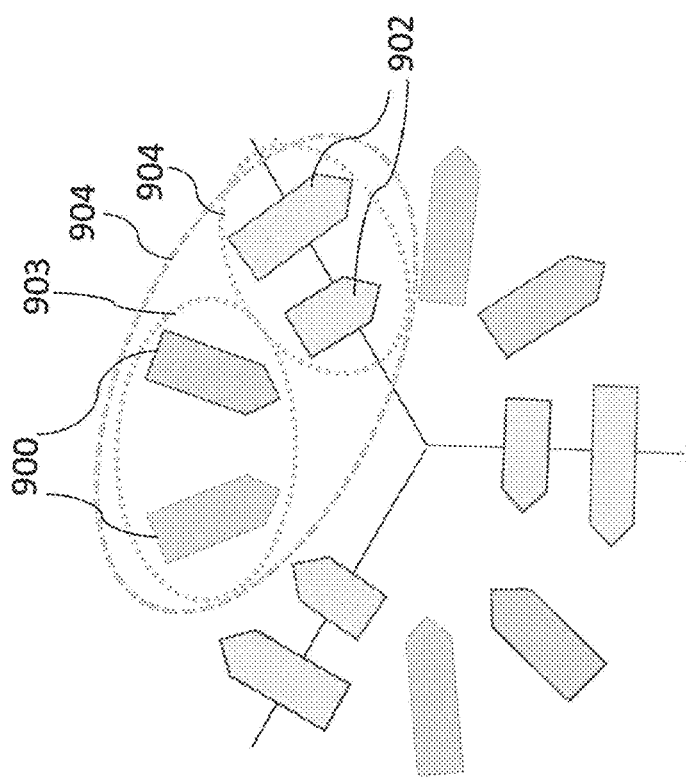

FIG. 9a shows a pattern for a 2 elevation 7 azimuth cell sector, with 3 cell sectors being provided. Those arrows referenced 900 represent boresight beams whilst those referenced 902 represent border beams.

In this embodiment, the bore sight beams of a sector of a cell are transmitted in a common slot 903. The border beams are transmitted in a common slot 903. The border beams are from two adjacent cell sectors. The border beams and the bore sight beams are transmitted in the same subframe 904.

FIG. 9b shows a pattern for a 4 elevation 7 azimuth cell sector, with 3 cell sectors being provided. Those arrows referenced 900 represent boresight beams whilst those referenced 902 represent border beams.

In this embodiment, the bore sight beams of a sector of a cell are transmitted in two common slots 903 as there are more beams than in the example of FIG. 9a. Half the beams from the first to fourth elevations are in one slot with the remainder in the other in the slot. The beams in each slot are spatially adjacent one another. The boresight beams are transmitted in the same subframe. The border beams are transmitted in two common slots 903. The border beams are from two adjacent cell sectors. The border beams are transmitted in the same subframe 904. The beams from the first and second elevations are sent in one slot and the beams from the third and fourth elevations are sent in the other slot.

Figure 9D:
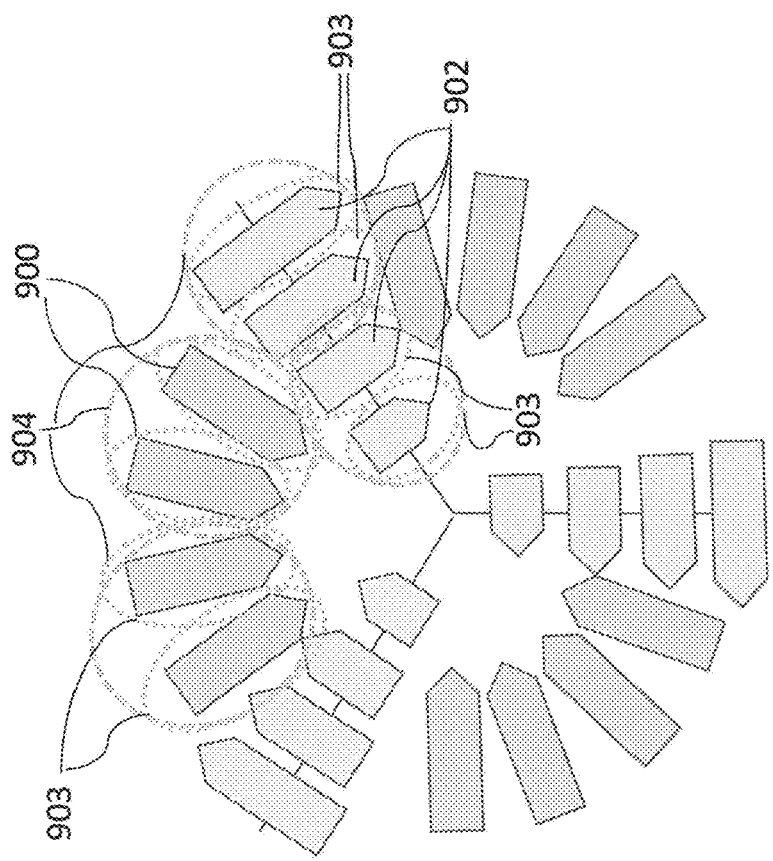
Figure 9C:
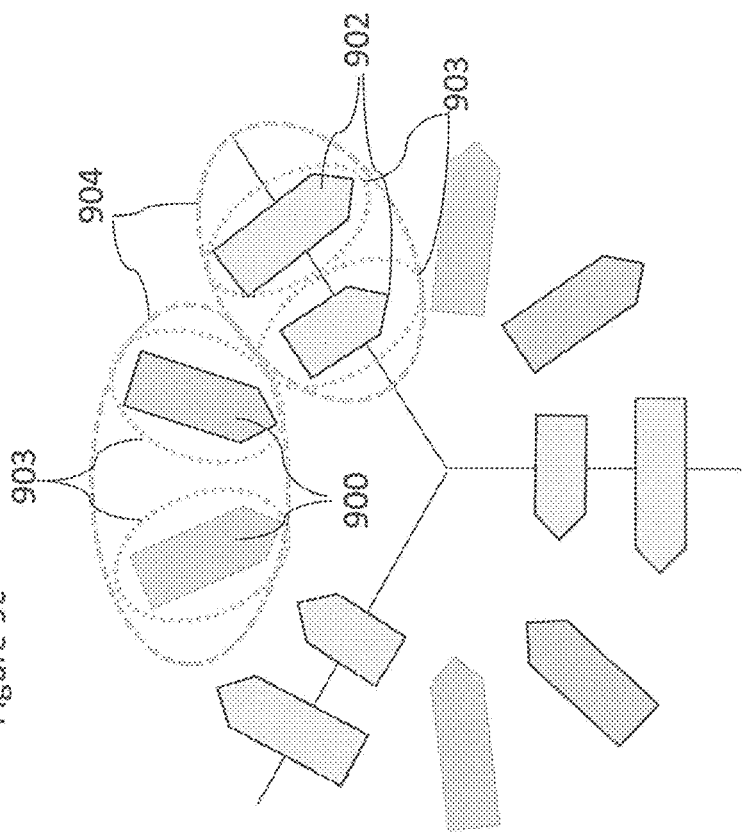

FIG. 9c shows a different pattern for a 2 elevation 7 azimuth cell sector, with 3 cell sectors being provided. Those arrows referenced 900 represent boresight beams whilst those referenced 902 represent border beams.

In this embodiment, the bore sight beams of a sector of a cell are transmitted in two common slots 903. Half the boresight beams covering both the first and second elevations and also being adjacent are sent in one slot with the other boresight beams being sent in the other slot. The boresight beams are transmitted in the same subframe. The border beams are transmitted in two common slots 903. The border beams are from two adjacent cell sectors. The border beams are transmitted in the same subframe 904. The beams from one elevation are sent in one slot and the beams from the other elevation are sent in the other slot.

FIG. 9d shows another pattern for a 4 elevation 7 azimuth cell sector, with 3 cell sectors being provided. Those arrows referenced 900 represent boresight beams whilst those referenced 902 represent border beams.

In this embodiment, the bore sight beams of a sector of a cell are transmitted in four common slots 903 as there are more beams than in the example of FIG. 9b. A given slot will have different beams from the four different elevations. The boresight beams are transmitted in two subframes. Adjacent beams are transmitted in the same subframe. The border beams are transmitted in four common slots 903. The border beams are from two adjacent cell sectors. The border beams are transmitted in the two subframes 904. The two inner elevations are transmitted in the same subframe and the two outer elevations are transmitted in a different subframe.

Figure 9E:
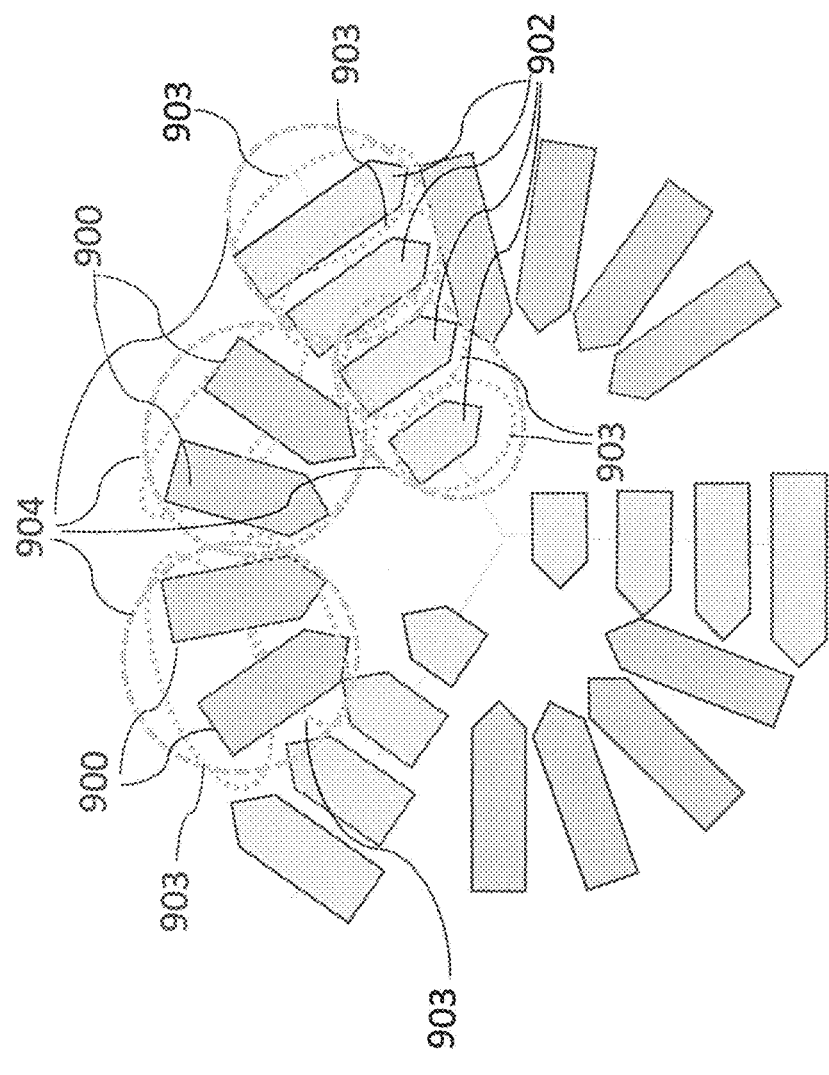

FIG. 9e shows another pattern for a 4 elevation 7 azimuth cell sector, with 3 cell sectors being provided. Those arrows referenced 900 represent boresight beams whilst those referenced 902 represent border beams.

In this embodiment, the bore sight beams of a sector of a cell are transmitted in four common slots 903. A given slot will have different beams for 2 of the different elevations. The boresight beams are transmitted in two subframes. The border beams are transmitted in four slots 903 with one elevation in each slot. The border beams are from two adjacent cell sectors. The border beams are transmitted in the two subframes 904. The two inner elevations are transmitted in the same frame and the two outer elevations are transmitted in a different frame.

Figure 10B:
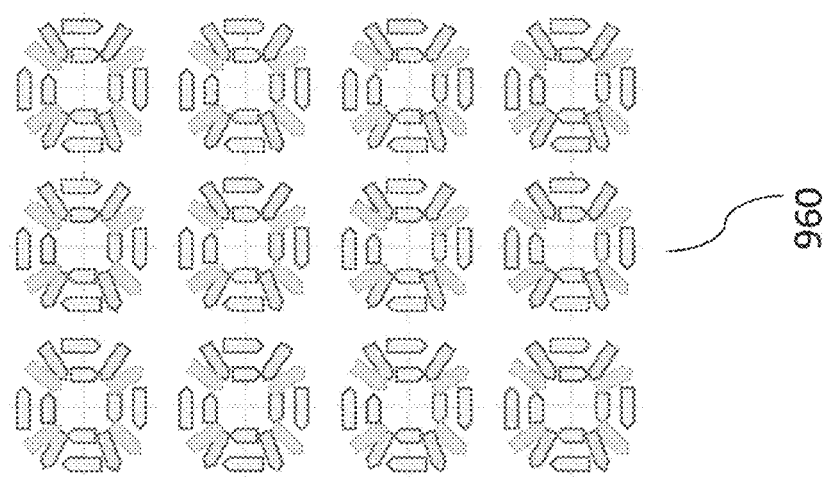
FIGS. 10a and 10b show example deployments of access points.
Figure 10A:
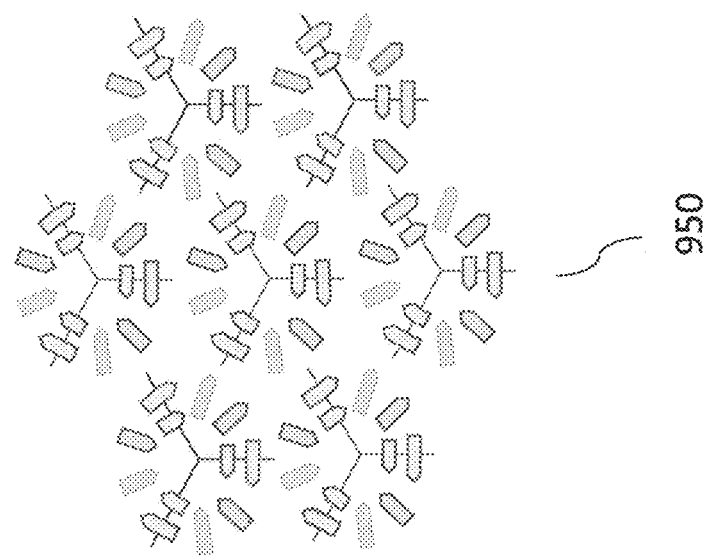

The access points are deployed to cover an area. FIGS. 10a, 10b and 10c show some different arrangements for deploying base stations.

The aim to avoid inter-cell interference is to have in all sectors in the BS/cell deployment having the same sweeping pattern of beams. However, adjustments are made to the sequence, if necessary, in order to avoid spatial and time overlap.

This "change of sequence" has the goal to reduce noise/interference between other access points. In some embodiments, all access points are running synchronized beam sweeping. In a regular access point deployment, there may be less interference, for example in the bore sight where the focus may be on a higher MCS, so that more data may be transferred between the access point and the UE. The handover region may have a lower priority, in some embodiments.

In the bore sight, there may be an inner/outer alternation (where there is more than one elevation) relatively quickly, so for each beam, as the interference towards the neighbor cells may be high if the spatial separation is small for beams transmitted at the same time from different access points.

FIG. 10a shows an example where the access point of FIG. 5 is deployed in an arrangement 950 where the hand over region of one access point cell sector border region is adjacent the boresight region of a cell sector of a different access point. The arrow heads represent the direction in which the beams are swept. As can be seen in some sectors the boresight beams are swept from outside to inside and in other sectors the beams sweep from inside to outside. This is to avoid interference with the beams in the handover region of a neighboring cell. The beams in the neighbor region sweep from around in the direction shows.

FIG. 10b shows an arrangement where the access point of FIG. 6 is deployed in a grid like arrangement 960. In this arrangement, there is a change in beam sequence in handover regions to avoid interference between the handover region of one access point with that of another access point. Likewise there is a change in beam sequence in the boresight of one cell sector of one access point as compared to the beam sequence in the bore sight of another cell sector of an adjacent cell sector.

As can be seen in some embodiments, by having a beam sequence number sometimes in one elevation of one cell sector and sometimes in another elevation in of another cell sector, this reduces the interference between boresight and/or hand over zones in different cell sectors of different access points.

The boresight area may be swept through in the same period of time, e.g., a slot. This ensures that the UE measurements happen as close as possible to avoid or reduce the impact of significant channel fluctuations as this may negatively impact the selection of the "best" beam. Selection of the best beam in the boresight has a direct impact on the selected MCS and the throughput for the user equipment.

The alternation between inner and outer beam areas may allow the adjustment of the sequence in one base station or access point to reduce the noise/interference level from user equipment sending their preambles in neighbor cells.

The neighbor areas may be coordinated between the two sectors of the same access point, or implicitly by two base stations operating by synchronization of a system frame number and the start of the system frame.

In order to ensure a good HO decision between the sectors and to avoid a ping pong HO, the user equipment may measure those beams relevant for the HO decision in the same period of time as well.

In case of a high noise level measured in the xPRACH, the eNB or access point may decide to swap the two beams in the neighbor area being on the same inner or outer distance.

Inside each slot or subframe, the beams sweeping sequence differs in each sector to reduce noise/interference between neighbor cells.

While in the HO Zone one sectors of the cell go through the inner and another through the outer beam group. The gain or power level in the HO zone is lower, and the neighbor sectors/cells may use the next beam.

Thus, the synchronization or sweeping beams are not sent all the time, but e.g., in a block or one or several consecutive slots, then a pause and then another block and so on. Close slots may be in such a block not split up by a pause. Beams for the HO region may even be in a single slot sweeping over the border region sequentially. The cells and sectors are from one access point in some embodiments.

It should be noted that some example beam sweeping orders have been given. There are of course a number of different beam sweeping orders which can be used in other embodiments.

In some embodiments, only one beam is transmitted at a time in a given cell sector during a sweeping operation. However, in other embodiments, more than one beam may be transmitted at a time in the same sector. In those embodiments, adjacent beams or beams which are considered to be relatively close are not transmitted at the same time.

It should be appreciated that in some embodiments, a method may be provided.

The method may control the transmission from the access point of the beams in the required order. For example reference is made to FIG. 11 which shows a method. In step S1, the transmission is caused from an access point of a set of beams in a first sweeping order in a first cell, the beams transmitting a reference signal, wherein a first subset of the beams is configured to be transmitted in a neighbor zone direction of the first cell, within a first common block of time as a second subset of beams being transmitted in a second cell in a neighbor zone direction, each beam being of the first and second subsets of beams being transmitted at different times in the first common block of time. Other features of the method may be as outlined previously.

The method may be performed by for example one or more processors at least one processor and at least one memory including computer code for one or more programs, the at least one memory and the computer code configured, with the at least one processor to provide the method. This apparatus may be provided in for example an access point.

The required data processing apparatus and functions may be provided by means of one or more data processors. The apparatus may be provided in the communications device, in the control apparatus and/or in the access point. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

What is claimed is:

1. A method comprising:
   causing transmission from an access point of a set of beams in a first sweeping order in a first sector of a cell, the beams transmitting a reference signal, wherein a first subset of the set of beams is transmitted in a neighbor zone direction of the first sector, within a first common block of time as a second subset of the set of beams being transmitted in a second sector of the cell in a neighbor zone direction, a third subset of the set of beams being transmitted in a central region of the first sector, and a fourth subset of the set of beams being transmitted in a central region of the second sector,
   wherein adjacent beams in the first and second subsets are transmitted in adjacent transmission opportunities; and
   wherein beams in the third and fourth subsets are transmitted at same times.

2. A method as claimed in claim 1, wherein the first sector has at least two elevation steps and for at least part of said first sector, the method comprises alternating transmission between the at least two elevation steps.

3. A method as claimed in claim 2, wherein the at least part of said first sector where there is alternating of transmission between the at least two elevation steps comprises the central region of the first sector.

4. A method as claimed in claim 1, wherein a transmission order is configured sector wise.

5. A method as claimed in claim 1, wherein the third subset of beams and the fourth subset of beams are transmitted before the first subset of beams and the second subset of beams.

6. A method as claimed in claim 1, wherein the first sweeping order is controlled such that beams are transmitted at a different time to adjacent beams in adjacent cells.

7. A computer program comprising computer executable code which when run on at least one processor is configured to perform the method of claim 1.

8. An apparatus comprising at least one processor and at least one memory including computer code for one or more programs, the at least one memory and the computer code configured, with the at least one processor, to cause the apparatus at least to:
   cause transmission from an access point of a set of beams in a first sweeping order in a first sector of a cell, the beams transmitting a reference signal, wherein a first subset of the set of beams is transmitted in a neighbor zone direction of the first sector, within a first common block of time as a second subset of the set of beams being transmitted in a second sector of the cell in a neighbor zone direction, a third subset of the set of beams being transmitted in a central region of the first sector, and a fourth subset of the set of beams being transmitted in a central region of the second sector, wherein adjacent beams in the first and second subsets are transmitted in adjacent transmission opportunities; and wherein beams in the third and fourth subsets are transmitted at same times.

9. An apparatus as claimed in claim 8, wherein the first sector has at least two elevation steps, wherein for at least part of the first sector the at least one memory and the computer code are configured, with the at least one processor, to cause the apparatus to alternate transmission between the at least two elevation steps.

10. An apparatus as claimed in claim 9, wherein the at least part of the first sector where there is alternating of transmission between the at least two elevation steps comprises the central region of the first cell.

11. An apparatus as claimed in claim 8, wherein the at least one memory and the computer code are configured, with the at least one processor, to cause the apparatus to transmit the third subset of beams and the fourth subset of beams before the first subset of beams and the second subset of beams.

12. An apparatus as claimed in claim 8, wherein the sweeping order is controlled such that beams are transmitted at a different time to adjacent beams in adjacent sectors.

* * * * *